(12) United States Patent
Jennings

(10) Patent No.: US 7,457,597 B1
(45) Date of Patent: Nov. 25, 2008

(54) SIGNAL DETECTION USING PROBABILISTIC TECHNIQUES

(75) Inventor: Cullen F. Jennings, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 843 days.

(21) Appl. No.: 10/634,668

(22) Filed: Aug. 5, 2003

(51) Int. Cl.
*H04B 17/00* (2006.01)
*H03C 1/62* (2006.01)
*H04M 3/00* (2006.01)

(52) U.S. Cl. .............. 455/226.1; 455/115.1; 455/67.11; 379/283

(58) Field of Classification Search .......... 455/22–229, 455/115.1–115.47, 67.11; 379/283
See application file for complete search history.

(56) References Cited

U.S. PATENT DOCUMENTS

| | | | |
|---|---|---|---|
| 5,809,133 A | 9/1998 | Bartkowiak et al. | 379/386 |
| 6,122,652 A | 9/2000 | Jin et al. | 708/312 |
| 6,400,996 B1 | 6/2002 | Hoffberg et al. | 700/83 |
| 2003/0123574 A1* | 7/2003 | Simeon et al. | 375/340 |

OTHER PUBLICATIONS

Doucet, et al., *Sequential Monte Carlo Methods in Practice,* © 2001 Springer-Verlag New York, Inc. (Chapter 1, 9 pages).

* cited by examiner

*Primary Examiner*—Matthew Anderson
*Assistant Examiner*—Eugene Yun
(74) *Attorney, Agent, or Firm*—Baker Botts L.L.P.

(57) ABSTRACT

A receiver uses probabilistic techniques to identify the value of a received signal based upon a space of potential signals that may be generated by the transmitter. The receiver uses one or more iterations in which received signal values are compared with potential signal models to enable identification of the incoming signal.

19 Claims, 4 Drawing Sheets

SIGNAL DETECTION USING PROBABILISTIC TECHNIQUES

TECHNICAL FIELD OF THE INVENTION

The present invention relates generally to signal detection and, more particularly, to signal detection using probabilistic techniques.

BACKGROUND OF THE INVENTION

In communications, devices must be able to receive and identify incoming signals. For example, in many telephony applications, equipment must support the detection of dual tone multi-frequency (DTMF) signals. In traditional systems, signal detection is typically performed using fast fourier transforms. Using the advanced signal processing devices available today, these techniques allow for relatively fast and accurate detection of signals.

SUMMARY OF THE INVENTION

In accordance with the present invention, techniques for signal detection using probabilistic techniques are provided. According to particular embodiments, these techniques enable communications equipment to detect and identify received signals faster, and in some cases more accurately, than previous techniques.

According to a particular embodiment, a method detecting a received signal determines a set of particles each modeling a potential signal generated by a transmitter, measures a received signal from the transmitter, and calculates a probability for each of the particles, the probability for a particle indicating likelihood of the potential signal modeled by the particle based upon the received signal. The method redistributes the particles within a space of potential signals that may be generated by the transmitter based upon the probabilities, selects one of the particles based upon the distribution of the particles within the space of potential signals, and outputs the potential signal modeled by the selected particle.

Embodiments of the invention provide various technical advantages. These techniques may enable fast and accurate analysis and identification of received signals without requiring a significant amount of resources. Therefore, certain embodiments enable signal detection using less processing and/or memory resources as compared with traditional techniques.

According to certain embodiments, the speed and/or accuracy of these techniques may depend upon the amount of processing and/or memory resources dedicated to signal detection. Moreover, these embodiments may enable varying levels of resources to be dedicated to signal detection tasks. Therefore, for example, system resources may be statically or dynamically allocated to increase or decrease the signal detection capabilities of particular communication sessions. This provide great flexibility for dynamically assigning resources to provide features such as quality of service and to permit full use of system resources even during periods of low network traffic.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a diagram illustrating exemplary operation of a particular embodiment of the receiver to provide modeling and detection of a data signal.

DETAILED DESCRIPTION OF THE DRAWINGS

Figure 1:
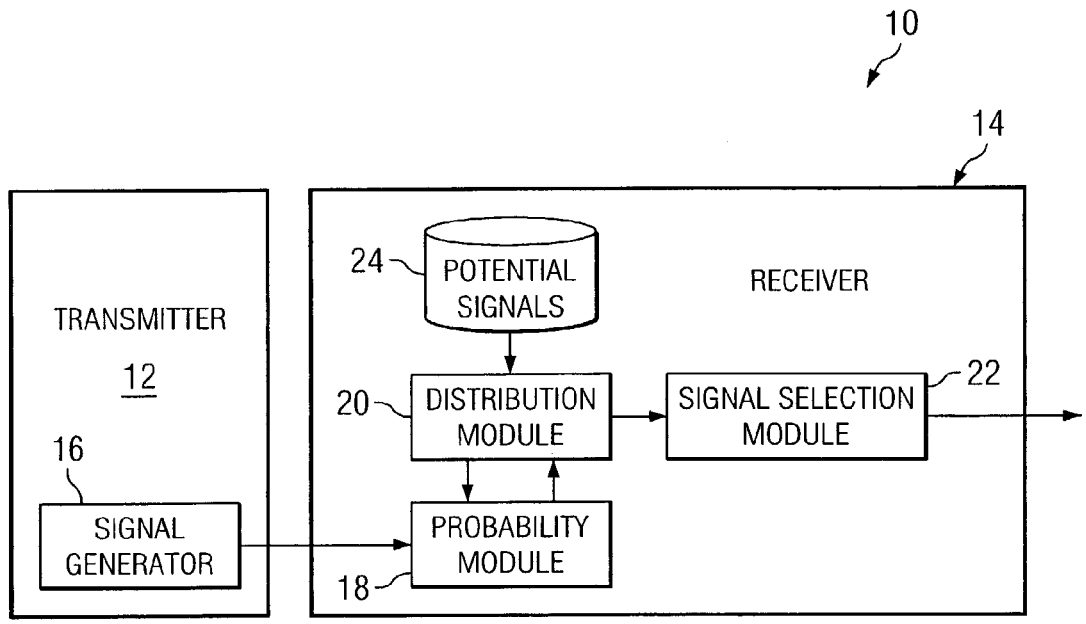
FIG. 1 illustrates a communication system that includes a receiver that operates in accordance with particular embodiments of the present invention.

FIG. 1 illustrates a communication system, indicated generally at 10, that includes a transmitter 12 and a receiver 14. In general, receiver 14 uses probabilistic techniques to identify received signals. According to particular embodiments, receiver 14 compares received signals to signal models and uses probabilities to refine analysis of the received signals through one or more iterations.

Transmitter 12 represents any suitable communications equipment and/or components, including appropriate controlling logic, for generating and communicating signals. While illustrated as a distinct component within system 10, it should be understood that transmitter 12 may be incorporated within or otherwise used by other devices for communicating signals. For example, transmitter 12 may be a component within a telephone device. Transmitter 12 supports the communication of signals from signal generator 16 to receiver 14 using any appropriate communication techniques and protocols. Thus, transmitter 12 may support any number of communication protocols and may transmit signals to receiver 14 using any suitable wireless and/or wireline communication techniques. In the embodiment illustrated, transmitter 12 includes a signal generator 16 for generating signals. For example, signal generator 16 may generate data signals that encode information using a particular protocol or format. As another example, signal generator 16 may generate signals, such as dual tone multi-frequency (DTMF) signals, in response to appropriate indications. However, while particular signal examples are provided, system 10 contemplates signal generator 16 supporting the generation of any appropriate communication signals.

Receiver 14 represents communications equipment, including appropriate controlling logic, for receiving and identifying signals using probabilistic techniques. In the embodiment illustrated, receiver 14 includes a probability module 18, a distribution module 20, a signal selection module 22, and a memory 24 that, as illustrated, maintains information detailing potential signals that may be received by receiver 14. For example, if receiver 14 expects to receive DTMF signals from transmitter 12, memory 24 may include information detailing the various tone frequencies that may be generated by signal generator 16. As another example, consider receiver 14 receiving data encoded within constellations generated by signal generator 16. In these cases, memory 24 may maintain information detailing the different constellation values that may be received. Thus, as shown by these two basic examples, memory 24 may store any appropriate information for modeling signals that may be received by receiver 14.

Distribution module 20 provides for the selection, distribution, and redistribution of "particles" that model signals potentially generated by transmitter 12. That is, each particle includes information specifying the characteristics of a potential source signal generated within generator 16. For example, consider signal generator 16 operating as a DTMF tone generator. For this example, each particle selected by distribution module 20 may specify a frequency and phase for a tone expected from signal generator 16. Distribution module 20 may select these particles to provide coverage across a space of potential signals expected from signal generator 16. Thus, for example, distribution module 20 may initially distribute selected particles evenly across a space of expected signals. Distribution module 20 may then redistribute these particles within the space based upon input, such as probabilities received from probability module 18. A particular example illustrating the distribution and redistribution of particles by distribution module 20 is discussed in greater detail below with respect to FIG. 2.

Probability module 18 analyzes signals received from transmitter 12 by comparing these signals with particles selected by distribution module 20. Probability module 18 applies probability analysis to determine likelihood that a received signal matches to the particles selected by distribution module 20. Probability module 18 then supplies the results of this analysis to distribution module 20, such that distribution module 20 may redistribute particles within the space of potential signals.

Signal selection module 22 monitors the distribution of particles provided by distribution module 20 and, upon detecting an appropriate distribution, outputs a signal indicated by the particle distribution. For example, when particles become sufficiently concentrated within a particular range, signal selection module 22 may output a signal modeled by those particles.

Thus during operation, distribution module 20 may initially select a distribution of particles within a space of potential signals. Probability module 18 then samples an incoming signal and, for each of the particles, provides a likelihood that that particle matches the sampled signal. With this information, distribution module 20 redistributes the particles within the space of potential signals. To provide this redistribution, distribution module 20 may increase the density of particles around likely candidates while decreasing the density of particles around unlikely candidates. For example, consider probability module 18 sampling a received signal and determining, for a number of particles, the likelihood that the signal matches to each of the particles. Based upon the likelihoods provided by probability module 18, distribution module 20 may redistribute the particles such that the unlikely particles are moved into proximity with likely particles.

As an extreme example, consider receiver 14 using two particles to model potentially received signals, and receiver 14 expecting to receive an analog signal indicating a binary value. As an initial distribution, distribution module 20 may, for example, select one particle that models the analog signal for a value of zero and select another particle that models the analog signal for a value of one. Probability module 18 may then sample a received signal and, for each of the two particles, determine the likelihood that the signal matches to the particle. Based upon these likelihoods, distribution module 20 may then redistribute the two particles such that both particles model the analog signal for the more likely of the two potential values. When using only two particles, this concentration of both particles at a particular value will likely be sufficient for signal selection module 22 to identify the appropriate value and provide this as an output.

To provide finer resolution and more accuracy, distribution module 20 will typically use more than two particles. Moreover, the space of potential signals to be received by receiver 14 will likely be far greater than two analog values. For example, for a signal that may have a frequency and phase bounded only by a minimum and maximum frequency, the space of potential signals is virtually infinite. Therefore, each sampling and analysis step performed by probability module 18 may potentially result in redistribution of any number of particles within a space of potential signals. This process may be iteratively performed such that the particles converge on or near to a particular signal. At some point, this distribution may include a convergence of particles sufficiently identifiable such that signal selection module 22 may output a signal indicated by at least one of the particles.

Figure 2:
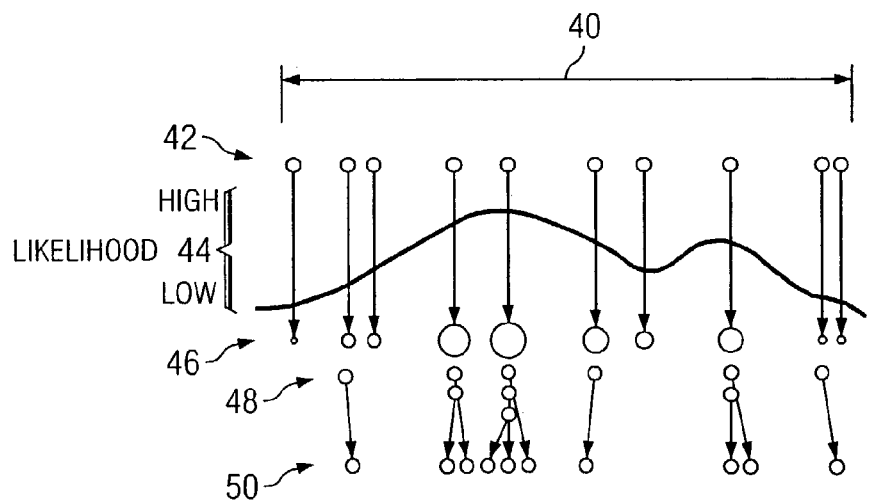
FIG. 2 is a diagram illustrating redistribution of signal modules based on probabilistic techniques.

FIG. 2 provides an example of particle redistribution based upon a single sampling of an incoming signal. As an initial step, distribution module 20 provides a distribution of particles within a space of potential signals that is indicated by the line at 40. Thus, as indicated at 42, distribution module 20 has selected ten particles ranging across potential space 40. Probability module 18 samples an incoming signal and develops, for each of the particles, a likelihood that that particle matches to the incoming signal. In this diagram, this knowledge is represented at 44 by the curving line that indicates likelihood from low to high at each point within potential space 40. However, while shown as a continuous line through potential space 40, it should be understood that probability module 18 may determine likelihoods only at those points within potential space 40 that include a particle.

In the diagram, the analysis performed by probability module 18 is integrated with the existing particles, and the illustrated size of the particles is adjusted in the diagram to illustrate relative likelihoods. Thus, for example, relatively unlikely particles are shown as small dots, while relative likely particles are shown as large dots. This representation of likelihood based upon dot size is indicated at 46. As illustrated at 48 and 50, the distribution and relative likelihood of the particles is used to redistribute these particles within space 40. For example, at 48, some likely particles are duplicated while selected unlikely particles are dropped. Then, at step 50, duplicated and/or selected particles may be slightly redistributed within space 40 based upon the measured likelihoods. As shown by this example, the redistribution performed by distribution module 20 may keep the same number of particles before and after redistribution. However, system 10 contemplates distribution module 20 using any appropriate adjustments of particles, including adding or deleting particles from an analysis, during redistribution.

According to particular embodiments, distribution module 22 uses Bayesian logic to enable redistribution of particles within the space of potential signals. This enables distribution module 22 to refine each successive distribution based upon cumulative probabilities for each particle. For example, using Bayesian logic, distribution module 22 can combine the prior likelihood of each particle with the current measurement to establish a posterior probability for each of the particles. Distribution module 22 may then resample the particles with replacement from the previous distribution based upon these posterior probabilities. This resampling can result in the number of particles within any portion of the signal space approximating the probability distribution of the signal being measured.

If the distribution of particles within space 40 provides sufficient clarity, signal selection module 22 may identify and output a signal indicated by one or more of the particles. For example, if the concentration of particles becomes sufficient within a particular portion of potential signal space 40, signal selection module 22 may output a signal modeled by one or more of these concentrated particles. Additionally or alternatively, distribution module 20 and probability module 18 may continue to receive, sample, and analyze signals, and redistribute particles based on this analysis, using an iterative process. Using an iterative process, the distribution of particles typically becomes increasingly concentrated with each iteration. Therefore, these techniques can provide a learning process in which each iteration provides additional knowledge for signal analysis. Therefore, with each iteration, the confidence of receiver 14 with respect to an identified signal typically increases.

While the preceding illustration provides for the distribution, sampling, analysis, and redistribution of ten particles, it should be clear that receiver 14 may use any suitable number of particles. Moreover, the number of particles used by receiver 14 may reflect the complexity of signals to be received. For example, for DTMF signals, receiver 14 may potentially use a relatively low number of particles, such as five to twenty particles, that provide relatively fast and accurate identification of DTMF signals. For complex signals, such as constellations with high numbers of potential values, receiver 14 may use hundreds or thousands of particles within a potential space of signals. However, even as the number of particles and complexity of signals increases, the advantages provided by these probabilistic techniques over traditional signal analysis techniques become more pronounced. Also, the number of particles used by receiver 14 during signal detection may be roughly proportional to the speed at which receiver 14 can accurately identify a received signal. Therefore, for example, if receiver 14 can accurately identify a DTMF signal within ten milliseconds using seven particles, then receiver 14 will potentially respond even faster by applying additional particles to the signal detection process.

The number of particles used by receiver 14 also impacts the memory and processing resources required for analysis. In many embodiments, the number of particles is roughly proportional to the requirement for system resources. Thus, each additional particle requires additional system resources. Based upon this property and the increased responsiveness flowing from increased number of particles, receiver 14 can dynamically and flexibly allocate system resources among signal detection tasks. For example, receiver 14 may provide system resources sufficient for processing signals from multiple communication sessions with enough dedicated particles to each session to provide a minimum quality of service. When processing less than this number of communication sessions, receiver 14 can allocate additional resources (by allocating additional particles) to one or more of the ongoing communication sessions. Additionally or alternatively, receiver 14 can provide quality of service levels by allocating differing numbers of particles to different types of communication sessions. These two examples highlight only a small fraction of the potential flexibility provided by implementing these probabilistic techniques within receiver 14.

Figure 3:
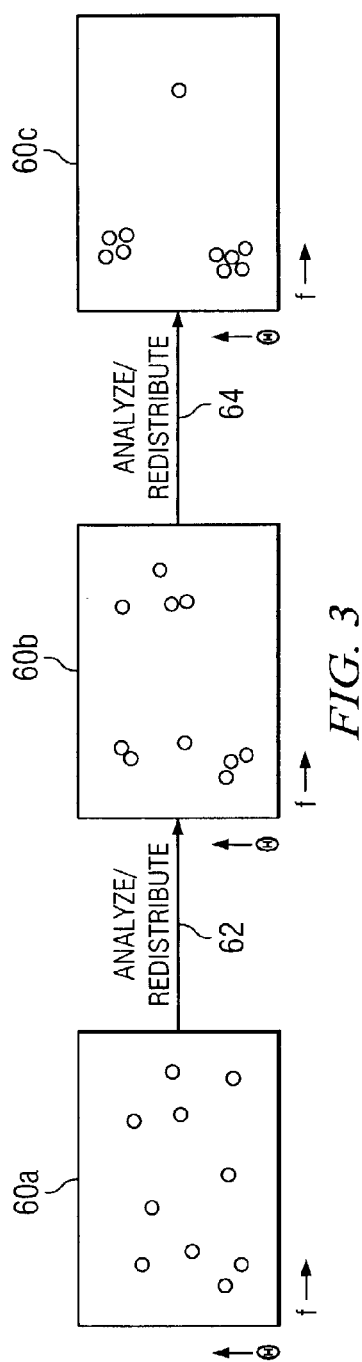
FIG. 3 is a diagram illustrating example operation of the receiver using probabilistic techniques to detect received signals.

FIG. 3 is a diagram illustrating distribution of particles within a frequency/phase space, indicated at 60, through two iterations of measurement and redistribution of the particles. Initially, as illustrated within space 60a, distribution module 20 distributes particles within a space of potential frequency/phase signals. At 62, probability module 18 samples a received sign al and analyzes likelihood for each of the particles, and distribution module 20 redistributes particles within space 60 based upon these measurements. Thus, distribution module 20 generates a new distribution of particles, as indicated at space 60b. At this point, the distribution of particles within space 60 may provide signal selection module 22 sufficient confidence to identify and output a signal. For example, if the particles have a concentration that exceeds some threshold, signal selection module 22 may identify and output a signal identified by this concentration of particles. Regardless, probability module 18 and distribution module 20 may continue to iterate and redistribute the particles. Thus at 64, probability module 18 samples the received signal and analyzes probability for each of the particles in space 60b, and distribution module 20 redistributes these particles. This provides for a new distribution, as illustrated in space 60c.

Thus this example illustrates the refinement of particle distribution that occurs during each iteration of a probabilistic signal analysis process. However, this illustration is provided only as an example, and system 10 contemplates receiver 14 using any suitable number of particles and signal models based upon the particular application of receiver 14.

Figure 4:
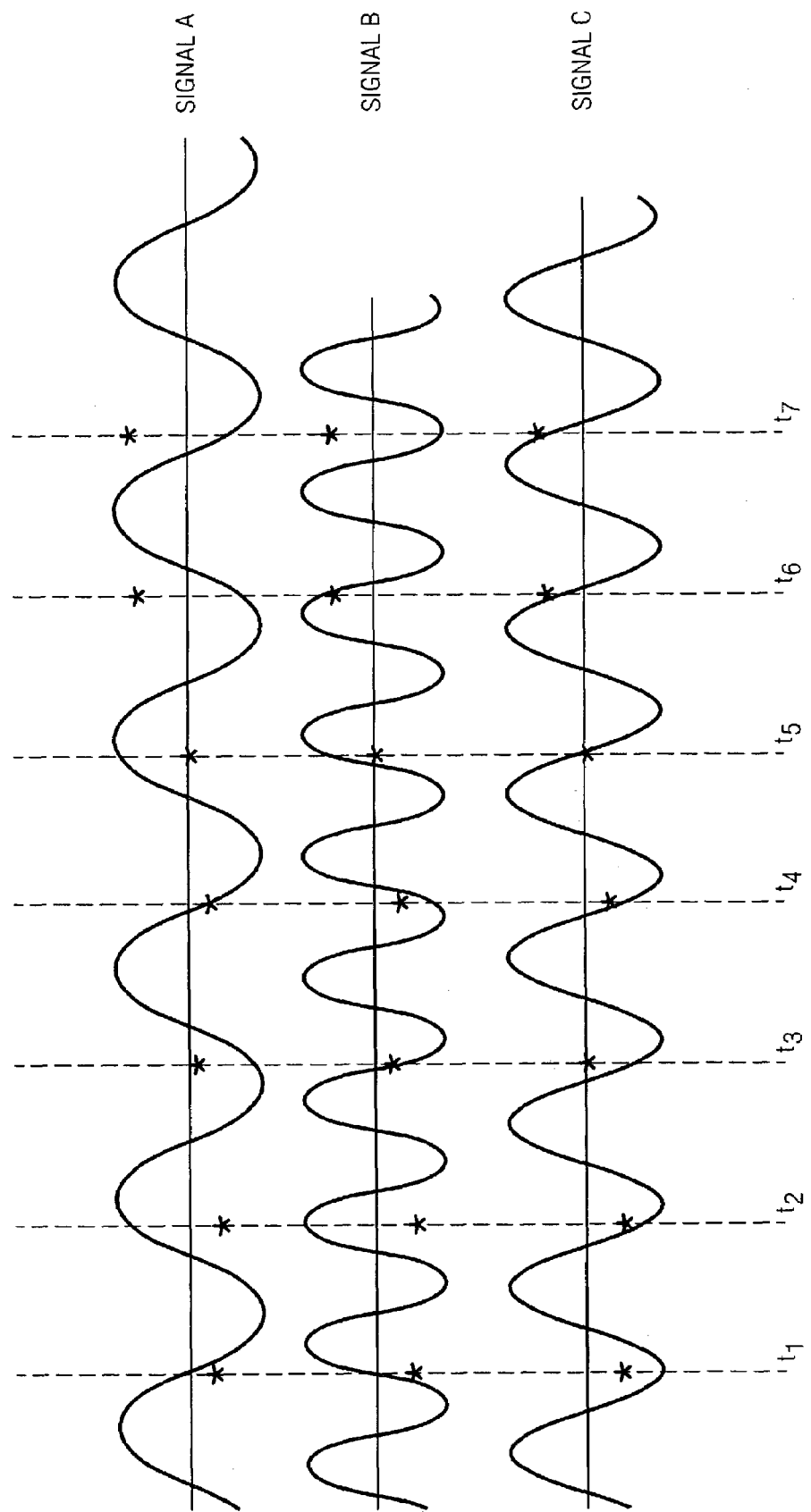
FIG. 4 is a diagram illustrating signal models and signal measurements to illustrate exemplary operation of particular embodiments of the receiver.

FIG. 4 is a time diagram illustrating three expected signals over time and a number of received signal samples as compared to these signals. In the diagram, the three signal models, for signal A, signal B, and signal C, are each shown on a separate, but time-aligned graph. In each of these three graphs, a signal measurement is shown at each of seven times. Thus, for example, an initial measurement at time $t_1$ is shown in the graphs for signal A, B, and C. Because of noise or other interference within system 10, receiver 14 may measure a signal that fails to match with any of the signal models. Thus as shown in this example, the measurement at time $t_1$ does not explicitly match to any signal model and provides for little differentiation between the models. However, probability module 18 may generate the likelihood that the measurement matches to each of these signal models, and distribution module 20 may use these likelihoods to determine a new distribution of particles among these potential signal models. Moreover, with each subsequent measurement, even if measured signals fail to match precisely to any particular model, the distribution of particles may become more concentrated around one of the signal models. Thus each subsequent measurement can provide increased confidence in an identified signal.

However, this timing diagram illustrates only an extremely simplified example of signal measurements compared with signal models. This example is provided only to clarify concepts behind the measurement and comparison of signal samples to signal models. However, as previously noted, system 10 contemplates receiver 14 using any suitable number and type of signal models from within a space of potential signals and providing any suitable mechanisms for measuring and analyzing likelihood of these potential models as compared with signal samples.

With the signal models provided in this example, each sample provides information for validating the entire signal model. Thus in this example, each measurement and redistribution of particles helps receiver 14 to determine whether the received signal is a sine wave with a particular frequency. However, these techniques may also be applied to any suitable type of signals, including multi-value signals that may include information varying over time. For example, each particle used by receiver 14 may model a data sequence, such as a word of binary information. In these circumstances, each sample and redistribution of particles may apply to only a portion of the signal model. For example, each iteration may measure information regarding a value during a particular bit period.

FIG. 5 is a diagram illustrating the operation of receiver 14 to identify a signal that includes varying values over time. In this illustration, receiver 14 uses particles that model a signal that includes three bits of information. This diagram illustrates a sequence of tables that include information detailing a model value (V) and a particle distribution (PD) as receiver 14 progresses through a series of bit periods. During a first bit period, only the initial bit in the three bit sequence has relevance. Thus, as illustrated at 80, particles are distributed between the models 0xx and 1xx. In this example, distribution module 20 uses twenty particles and initially distributes these particles evenly between the two potential values. Probability module 18 and distribution module 20 perform one or more iterations during the first bit period to sample a received signal and redistribute particles. After the one or more iterations, distribution module 20 has redistributed the particles between the two potential models. In the example illustrated, distribution module 20 has redistributed the particles to provide six particles for the model 0xx and fourteen particles for the model 1xx. This may result, for example, from a single iteration in which probability module 18 places the probability of a received zero at 30% and the probability of a received one at 70%.

When moving to the next bit period, at 86, distribution module 20 may redistribute the particles between the increased number of potential models. That is, during the second bit period, particles may be distributed and redistributed among four potential models, 00x, 01x, 10x, and 11x. The distribution provided at the start of the second bit period is illustrated at 88. At this point, distribution module 20 has attempted to relatively evenly split particles between the potential values. However, as previously noted, distribution module 20 may use any suitable techniques for initially distributing these particles among potential signals.

As with the previous bit period, probability module 18 and distribution module 20 may provide one or more iterations to refine the distribution of particles within the space of potential signals. At the end of the second bit period, distribution module 20 arrives at a particle distribution, indicated at 92. This distribution indicates one particle within the model for 00x, six particles for 01x, one particle for 10x, and twelve particles for 11x. With the redistribution illustrated in this example, it is apparent that one particle has moved from a 1xx model into a 0xx model. That is, as indicated at 84 and 88, the particle distribution provides for six particles corresponding to 0xx models and fourteen corresponding to 1xx models, while at 92, the particle distribution provides for seven particles corresponding to 0xx models and thirteen particles for 1xx models. This illustrates that distribution module 20 may distribute particles according to any appropriate probabilities, factors, and/or other suitable criteria, since one of the particles has migrated from the 1xx model into the 0xx model.

Moving from the second period to the third bit period, as illustrated at 94, distribution module 20 redistributes the particles among eight different bit sequence models. With this distribution, as illustrated at 96, distribution module 20 may once again attempt to relatively evenly split particles among relatively equal probability models. Thus, for example, distribution module 20 splits the twelve particles from the 11x model evenly between the 110 model and the 111 model.

Probability module 18 and distribution module 20 once again perform one or more iterations to refine the distribution of particles, as indicated at 98. The resulting distribution, indicated at 100, provides a distribution of particles for use by signal selection module 22 in identifying and outputting the signal. In the embodiment illustrated, twelve particles indicate a received value of 110 while seven particles indicate a received value of 010. Thus, signal selection module 22 would likely determine that 110 reflects the signal from transmitter 12.

According to particular embodiments, a data stream may include information to verify and/or correct the integrity of received data. For example, the data stream may include a parity bit to enable error checking at receiver 14. If this scenario is assumed for the three bit data value example provided above, receiver 14 can discard the 010 model as it violates parity rules. Thus, even if the initial bit of the three bit sequence was given a 50% probability for both zero and one, the iterative particle redistribution process maintains sufficient information to potentially recover from such a poorly received bit. Therefore, applying these probabilistic techniques to receipt of multiple value signals can provide greater error protection and recovery as compared with traditional techniques.

Figure 6:
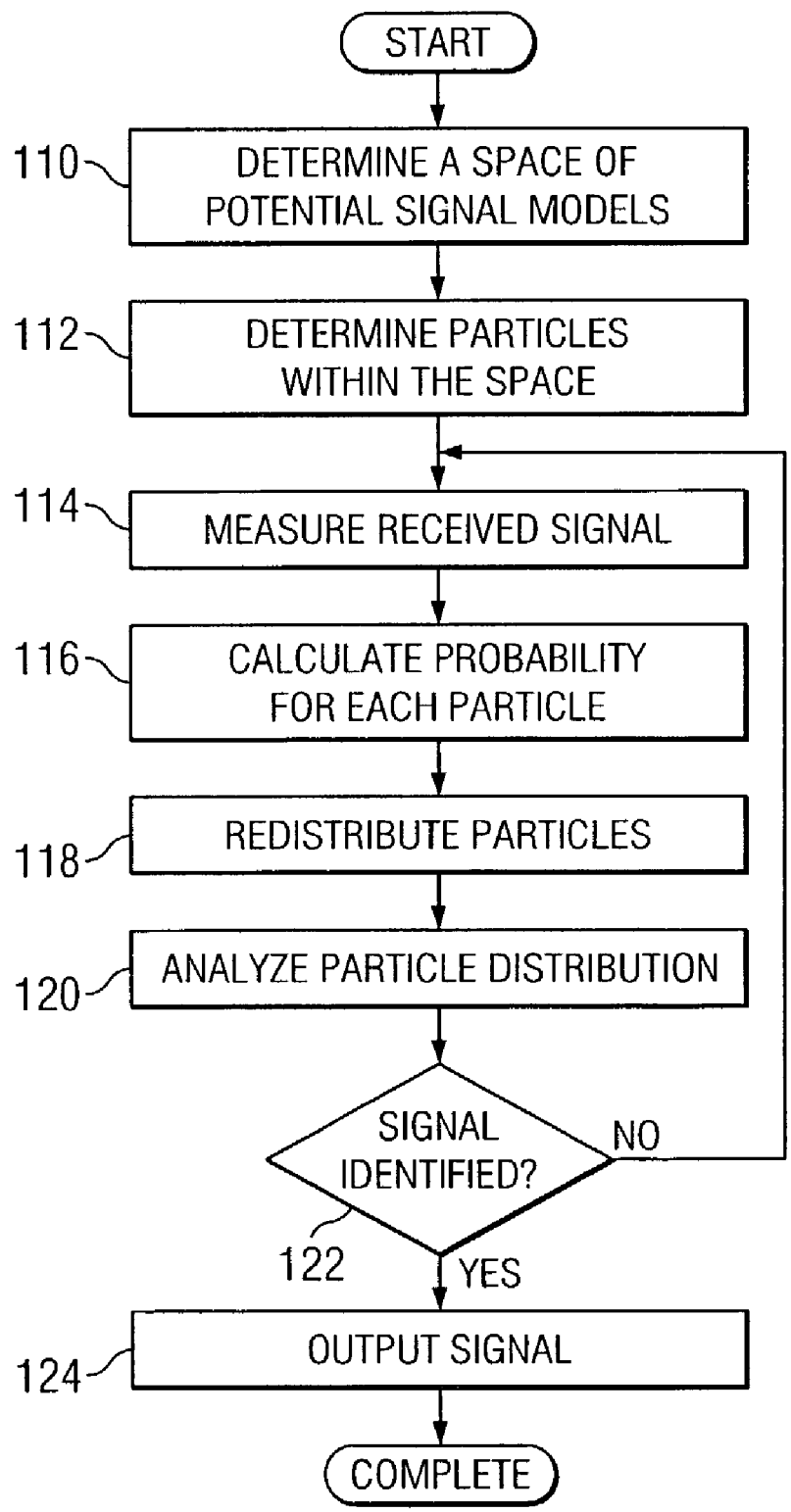
FIG. 6 is a flowchart illustrating a method for providing signal detection using probabilistic techniques.

FIG. 6 is a flowchart illustrating a method for receiver 14 to receive and analyze a signal using probabilistic techniques. Distribution module 20 determines a space of potential signal models at step 110 and determines particles within the space at step 112. For example, distribution module 20 may access potential signals modeled within memory 24 and select some predetermined number of particles representing potential signals. Probability module 18 measures a received signal at step 114 and calculates the probability for each particle at step 116. For example, probability module 18 may compare the signal sample to each particle and generate a likelihood for each particle using any appropriate probabilistic measurement techniques. Probability module 18 provides these measurements to distribution module 20.

Based upon this information from probability module 18, distribution module 20 redistributes the particles within the space of potential signals at step 118. Signal selection module 22 analyzes the particle distribution at step 120 and determines whether a signal is identified at step 122. For example, signal selection module 22 may determine whether the concentration of particles within a particular part of the potential signal space has exceeded a threshold. Upon identifying a signal, signal selection module 22 outputs the signal indicated by the particle concentrations at step 124. However, until signal selection module 22 identifies the incoming signal (or even after signal selection module 22 identifies the incoming signal), probability module 18 and distribution module 20 may continue to sample received signals and refine the distribution of particles.

Thus, the illustrated flowchart provides an exemplary method for signal analysis using probabilistic particle distribution techniques. However, while the preceding flowchart and accompanying description illustrate a particular method for receiver 14 to provide probabilistic signal analysis, this provides only an exemplary method of operation. System 10 contemplates receiver 14 using any appropriate techniques to provide probabilistic signal analysis. Thus, many of the steps in this flowchart may take place simultaneously and/or in different orders than as shown. In addition, receiver 14 may use methods with additional steps, fewer steps, and/or different steps, so long as the methods remain appropriate.

Moreover, while system 10, and in particular receiver 14, are illustrated and described with focus on a particular embodiment that includes specific elements providing particular functions, it should be understood that these devices and elements are provided only to clarify the operation of particular embodiments of probabilistic signal analysis. Therefore, while particular elements and functionalities are described with respect to receiver 14, these functionalities may be separated or combined as appropriate and may be provided by any suitable combination and arrangement of hardware, firmware, and other appropriate controlling logic.

Thus, for example, much of the probabilistic signal analysis functionality described may be implemented by code executing on processing devices.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for detecting a received signal comprising:
   determining a set of particles each modeling a potential signal generated by a transmitter;
   measuring a received signal from the transmitter;
   calculating a probability for each of the particles, the probability for a particle indicating likelihood of the potential signal modeled by the particle based upon the received signal;
   redistributing the particles within a space of potential signals that may be generated by the transmitter based upon the probabilities;
   selecting one of the particles based upon the distribution of the particles within the space of potential signals; and
   outputting the potential signal modeled by the selected particle.

2. The method of claim 1, further comprising performing the steps of measuring, calculating, and redistributing for a plurality of iterations, wherein over the course of the iterations, at least some of the particles converge upon a particular signal within the space of potential signals.

3. The method of claim 1, further comprising:
   determining that a concentration of the particles within a particular portion of the space of potential signals exceeds a threshold concentration; and
   in response to determining that the concentration exceeds the threshold concentration, selecting the one of the particles from within the particular portion of the space of potential signals.

4. The method of claim 1, further comprising performing the steps of measuring, calculating, and redistributing for a plurality of iterations, wherein each of the iterations provides information for a portion of each of the potential signals modeled by the particles.

5. The method of claim 4, wherein each of the potential signals models a sequence of values, and wherein each of the iterations provides measurements directed to a particular value from the sequence.

6. The method of claim 5, wherein the sequence of values is characterized by an error correction code, the method further comprising selecting the one of the particles based upon the distribution of the particles within the space of potential signals and the error correction code.

7. The method of claim 1, further comprising:
   monitoring processing resources to determine available ones of the processing resources; and
   determining a number of the particles to assign to signal detection based upon the available processing resources.

8. The method of claim 1, further comprising determining a number of the particles to assign to signal detection based upon an assigned quality of service level.

9. The method of claim 1, further comprising performing the steps of measuring, calculating, and redistributing for a plurality of iterations, wherein for each of the iterations, the step of redistributing removes unlikely ones of the particles and multiplies likely ones of the particles such that the number of particles in each of the iterations remains constant.

10. A receiver comprising:
    a memory maintaining data detailing a space of potential signals that may be generated by a transmitter;
    a distribution module operable to determine a set of particles each modeling a potential signal from the space of potential signals and to redistribute the particles within the space of potential signals based upon probabilities for each of the particles;
    a probability module operable to measure a received signal from the transmitter and to calculate a probability for each of the particles, the probability for a particle indicating likelihood of the potential signal modeled by the particle based upon the received signal; and
    a signal selection module operable to select one of the particles based upon the distribution of the particles within the space of potential signals and to output the potential signal modeled by the selected particle.

11. The receiver of claim 10, wherein the probability module and the distribution module perform the operations of measuring, calculating, and redistributing for a plurality of iterations, wherein over the course of the iterations, at least some of the particles converge upon a particular signal within the space of potential signals.

12. The receiver of claim 10, wherein the signal selection module is further operable to:
    determine that a concentration of the particles within a particular portion of the space of potential signals exceeds a threshold concentration; and
    in response to determining that the concentration exceeds the threshold concentration, to select the one of the particles from within the particular portion of the space of potential signals.

13. The receiver of claim 10, wherein the probability module and the distribution module perform the operations of measuring, calculating, and redistributing for a plurality of iterations, wherein each of the iterations provides information for a portion of each of the potential signals modeled by the particles.

14. The receiver of claim 13, wherein each of the potential signals models a sequence of values, and wherein each of the iterations provides measurements directed to a particular value from the sequence.

15. The receiver of claim 14, wherein the sequence of values is characterized by an error correction code, the signal selection module further operable to select the one of the particles based upon the distribution of the particles within the space of potential signals and the error correction code.

16. The receiver of claim 10, further comprising:
    a plurality of processing resources; and
    the distribution module further operable to determine available ones of the processing resources and to determine a number of the particles to assign to signal detection based upon the available processing resources.

17. The receiver of claim 10, wherein the distribution module is further operable to determine a number of the particles to assign to signal detection based upon an assigned quality of service level.

18. The receiver of claim 10, wherein the probability module and the distribution module perform the operations of measuring, calculating, and redistributing for a plurality of iterations, wherein for each of the iterations, the distribution module redistributes the particles to remove unlikely ones of the particles and to multiply likely ones of the particles such that the number of particles in each of the iterations remains constant.

19. A receiver comprising:

means for determining a set of particles each modeling a potential signal generated by a transmitter;

means for measuring a received signal from the transmitter;

means for calculating a probability for each of the particles, the probability for a particle indicating likelihood of the potential signal modeled by the particle based upon the received signal;

means for redistributing the particles within a space of potential signals that may be generated by the transmitter based upon the probabilities;

means for selecting one of the particles based upon the distribution of the particles within the space of potential signals; and means for outputting the potential signal modeled by the selected particle.

* * * * *